United States Patent
Cui

(10) Patent No.: US 7,042,461 B2
(45) Date of Patent: May 9, 2006

(54) WINDOW IDLE FRAME MEMORY COMPRESSION

(75) Inventor: Ying Cui, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/800,182

(22) Filed: Mar. 11, 2004

(65) Prior Publication Data

US 2004/0174369 A1 Sep. 9, 2004

Related U.S. Application Data

(63) Continuation of application No. 09/968,166, filed on Sep. 28, 2001, now Pat. No. 6,731,290.

(51) Int. Cl.
G06T 9/00 (2006.01)
G06F 15/00 (2006.01)
G06F 1/00 (2006.01)

(52) U.S. Cl. .................. 345/555; 345/501
(58) Field of Classification Search ........... 345/503, 345/531, 534, 542, 545, 555, 600, 601, 605, 345/501, 530
See application file for complete search history.

(56) References Cited

U.S. PATENT DOCUMENTS

| | | | |
|---|---|---|---|
| 4,813,056 A | 3/1989 | Fedele | |
| 4,914,508 A | 4/1990 | Music et al. | |
| 5,083,860 A | 1/1992 | Miyatake et al. | |
| 5,512,921 A | 4/1996 | Mital et al. | |
| 5,740,345 A * | 4/1998 | Danielson et al. | 345/593 |
| 5,748,771 A | 5/1998 | Fujiwara | |
| 5,774,191 A | 6/1998 | Iverson | |
| 5,845,140 A | 12/1998 | Stanley et al. | |
| 5,930,387 A | 7/1999 | Chan et al. | |
| 5,930,390 A | 7/1999 | Coelho | |
| 5,961,617 A * | 10/1999 | Tsang | 710/100 |
| 5,963,672 A | 10/1999 | Yajima et al. | |
| 6,026,180 A | 2/2000 | Wittenstein et al. | |
| 6,037,982 A | 3/2000 | Coelho | |
| 6,359,625 B1 * | 3/2002 | Perego | 345/555 |
| 6,606,409 B1 | 8/2003 | Warnick et al. | |

* cited by examiner

Primary Examiner—Kee M. Tung
(74) Attorney, Agent, or Firm—Blakely, Sokoloff, Taylor & Zafman LLP

(57) ABSTRACT

Idle frames received by a graphics controller are compressed by evaluating two idle frames to create an encoding table used to replace selected pixel byte values in subsequent idle frames with codes. Possible pixel byte values are associated with a first set of counters, with each counter counting several different byte values as they occur with the first idle frame. A first subset of the possible pixel byte values is selected based on the counts in the first counters and each byte value in the first subset is associated with a second counter. The occurrences of the first subset of pixel byte values are counted in the second idle frame, and a second subset of pixel byte values is selected based on the counts in the second counters and used to create the encoding table. In one aspect, the encoding table is created when the second set of pixel byte values satisfy a threshold.

31 Claims, 9 Drawing Sheets

WINDOW IDLE FRAME MEMORY COMPRESSION

RELATED APPLICATIONS

This application is a continuation of U.S. patent application Ser. No. 09/968,166 filed on Sep. 28, 2001 now U.S. Pat. No. 6,731,290.

FIELD OF THE INVENTION

This invention relates generally to graphics controllers, and more particularly to compressing frames within a graphics controller.

BACKGROUND OF THE INVENTION

A graphics controller converts image data and instructions into pixels and stores the pixels in graphics or system memory until time to refresh the image on the display device, at which point the pixels are retrieved from memory and sent to the display device. When the application that is generating the image is idle, the image being displayed does not change from one refresh cycle to the next. However, the graphics controller continues to fetch the corresponding pixels in the memory for every refresh cycle. As a result, the amount of power consumed by fetching the pixels from memory is the same whether the pixels are for an idle or an active image since the power consumption is proportional to memory fetch bandwidth.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The operations of a computer system display adapter 100 that compresses and decompresses idle frames according to one embodiment of the present invention are described with reference to FIG. 1. The compression operations are described in further detail in conjunction with FIGS. 2 and 3. As is common with add-in display adapters, display adapter 100 includes a graphics controller 101, such as a microprocessor, and graphics memory 103. In other embodiments, the graphics controller 101 may be embedded in the motherboard that holds the central processing unit and system memory may used as graphics memory 103.

Figure 1:
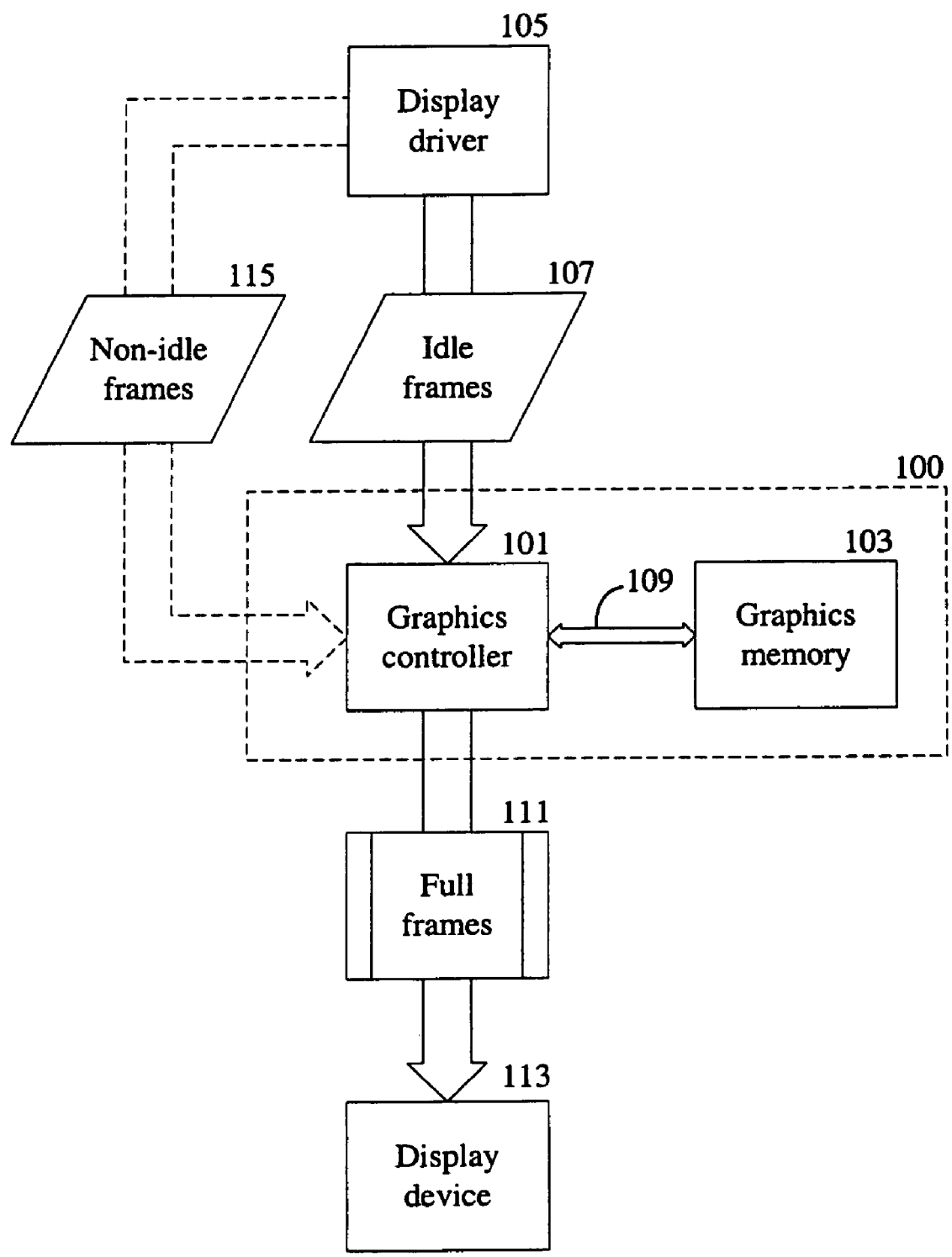
FIG. 1 is a diagram illustrating operations of a graphics controller that incorporates an embodiment of the invention.

In the embodiment illustrated in FIG. 1, the graphics controller 101 is notified by a display driver 105 that the display driver is idle, i.e., the image on a display device 113 is not changing. When the graphics controller 101 receives the idle notification, all frames it subsequently receives from the display driver 105 are idle frames 107 until it is notified that the display driver 105 is no longer idle. Generally, a few pixel values will be predominate in an idle frame. The graphics controller 101 determines the pixel values that represent a pre-determined percentage of the total idle frame and compresses those values. The resulting compressed idle frames are stored in the graphics memory 103 (illustrated by arrow 109), resulting in lower power consumption by the graphics memory 103. When it is necessary to refresh the image on a display device 113, the graphics controller 101 reads the compressed idle frame from the graphics memory 103 and decompresses it into the full frame 111, which is displayed by the display device 113.

In an alternate embodiment illustrated in FIG. 1, the graphics controller 101 may also compress non-idle frames 115 when it receives an override indicator from the display driver 105. The override indicator is set in the display driver 105 at the application level when an application program is aware that the changes between frames is minimal, for example, only if the cursor blinks or the clock is updated. Although the following details of the operation of the graphic controller 101 are described in terms of idle frames, the graphics control 101 handles non-idle frames in the same manner when the override indicator has been received.

The greater the color depth of an image, the more bits required to represent the color of a pixel. The invention is described herein with reference to "true color," in which each pixel is defined by three bytes, with each byte representing the value for each of the red, blue and green color components that define the color of a single pixel. Therefore, each pixel byte can have a value of 0–255. One of skill in the art will immediately understand the application of the invention to color depths requiring fewer or greater number of bits and the invention is not limited by its description in terms of true color. It also will be appreciated that the invention is independent of the display resolution.

Figure 2:
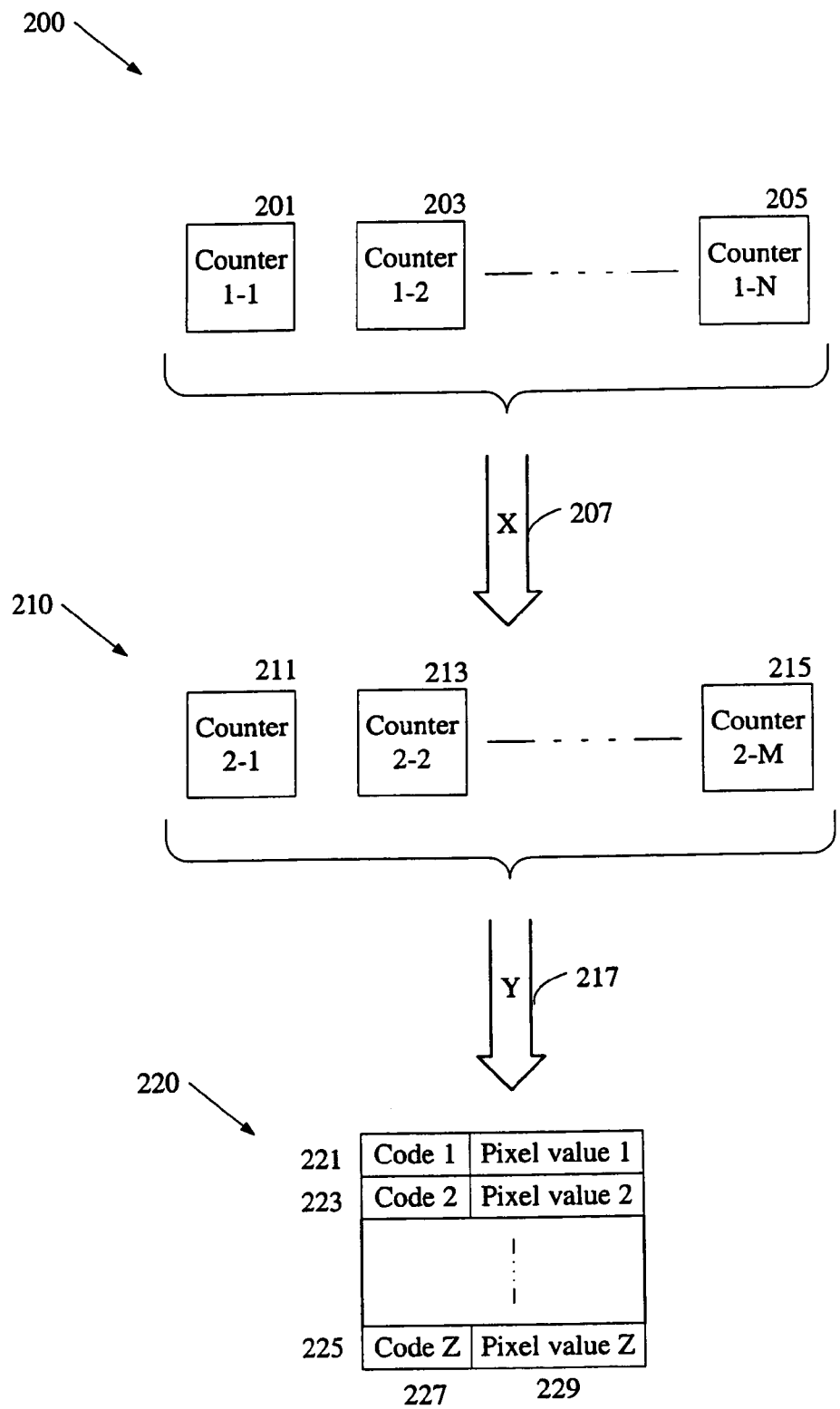
FIG. 2 is a diagram illustrating data structures for use in one embodiment of the invention.

The graphics controller 101 evaluates two idle frames to determine which pixel byte values predominate the values in the idle frame and creates an encoding look-up table from the results as illustrated in FIG. 2. Upon notification that the display driver 105 is idle, the graphic controller 101 initializes a first series of counters 200 (counter 1-1 201, 1-2 203 ... 1-N 205), where N is dependent on the current color depth for the display adapter. Each counter 200 is associated with a subset of the possible byte values, with the values in a set usually in numerical sequence although the invention is not so limited. So, for example, assuming a range of values from 0–255, if N is thirty-two, each counter will count eight different byte values, such as 0–7, 8–15, etc.

When an idle frame is received from the display driver 105, the graphics controller 101 evaluates each pixel byte to determine with which counter its value is associated and updates the appropriate counter by one. Once all the pixel bytes within the frame have been evaluated, the graphics controller 101 selects X counters having the highest counts i.e., associated with the byte values that occurred the most frequently in the frame (illustrated by arrow 207).

The graphics controller 101 initializes a second series of counters 210 (counter 2-1 211, 2-2 213 . . . 2-M 215) to determine which byte values within the top X counters occur the most frequently. Each counter 210 is associated with only one byte value. Continuing with the example, assuming X equals four, M equals thirty-two, i.e., four counters times eight values per counter. It will be appreciated that the graphics controller 101 can utilize the same structures for counters 200 and the counters 210.

Upon receiving another idle frame, the graphics controller 101 evaluates the pixel bytes, updates the counters 210 as appropriate, and determines if the top Z counters 210 satisfy a threshold Y. If so, the graphics controller 101 assigns a code 227 to each of the Z byte values and creates an entry 221, 223, 225 in an encoding look-up table 220 containing the code 227 and the associated byte value 229 (illustrated by arrow 217). Thus, for example, the graphics controller 101 would only compress an idle frame if the top four (Z) values represented at least 75% (Y) of the total different values present in the idle frame. It will be appreciated that the parameters N, M, X and Z are pre-determined for each available color depth of the display adapter 100, while Y is a pre-determined percentage of the total byte values or other measurement of the predominance of certain byte values. The various values for the parameters N, M, X, Y, and Z may be determined through experiments.

The graphics controller 101 uses the look-up table 220 to compress subsequent idle frames. In an embodiment illustrated in FIG. 3, four different compression modes are used to compress a true color idle frame given a graphics memory 103 read/write block size of 128 bits. Each compressed pixel byte is represented by a two-bit code. One of skill in the art will immediately conceive of alternate embodiments that use other code lengths and various algorithms to assign the code values and these alternate embodiments are considered within the scope of the invention.

Figure 3:
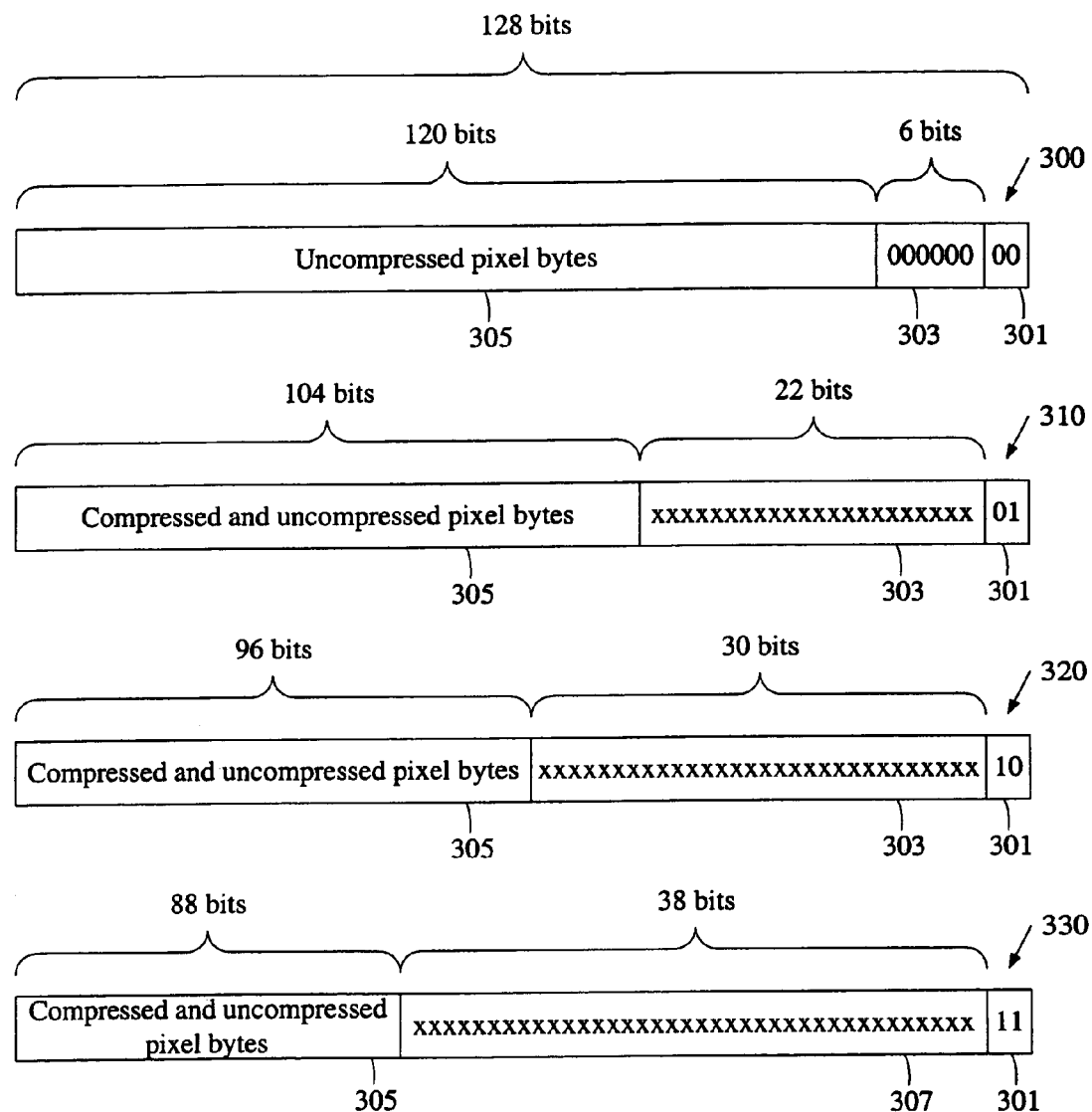
FIG. 3 is a diagram illustrating encoding modes used by one embodiment of the invention.

Each block of 128 bits is encoded with a two-bit mode field 301, a variable length encoding key 303, and a variable length data field 305. The pixel bytes, compressed and/or uncompressed, are stored in the data field 305. Each bit in the encoding key 303 represents one of the stored pixel bytes. A zero-bit indicates that the corresponding pixel byte is uncompressed and a one-bit indicates that the corresponding pixel byte is compressed. It will be appreciated that the exemplary block encodings shown in FIG. 3 are not intended to limit the invention and one of skill in the art will readily conceive of other encodings that are equally applicable and are considered within the scope of the invention.

Each compression mode is designed to encode a different range of compressed pixel bytes within a sequence. If fewer than four pixel bytes in a sequence of fifteen can be compressed, mode 0 (00) is used and none of the fifteen pixel bytes in data field 305 are compressed, resulting in all zeros in the encoding field 303 of block 300. Table 1 specifies the various combinations (patterns) of compressed and uncompressed pixel bytes that can be stored in a 128-bit block for each of the compression modes 1 through 3.

TABLE 1

| Mode 1 (01) (data 104 bits; max bytes 22) | | Mode 2 (10) (data 96 bits; max bytes 30) | | Mode 3 (11) (data 99 bits; max bytes 38) | |
|---|---|---|---|---|---|
| Compressed | Uncompressed | Compressed | Uncompressed | Compressed | Uncompressed |
| 4 | 12 | 13–16 | 8 | 25–28 | 4 |
| 5–8 | 11 | 17–20 | 7 | 29–32 | 3 |
| 9–12 | 10 | 21–24 | 6 | 33–36 | 2 |

It will be appreciated that for some combinations, not all the encoding bits in the encoding field 303 will be used since fewer pixel bytes will be stored in data field 305 than there are encoding bits. Because the mode field 301 indicates the length of the data field 305, during decompression the graphics controller 101 will recognize that it has parsed all the pixel bytes from the data field 305 even though some encoding bits have not been processed. Similarly, for some combinations the last one to seven bits of the data field 305 may be unused and the corresponding encoding bit set to zero, but the graphics controller 101 will recognize that the unused bits do not represent an uncompressed pixel byte, which requires eight bits.

Next, the particular methods performed by a graphics controller to perform the operations for the embodiments of the invention described above are described with reference to flowcharts in FIGS. 4A–C, in which executable instructions are represented by blocks 401 until 431, blocks 441 until 471, and block 481 until 499, respectively. Describing the methods by reference to a flowchart enables one skilled in the art to develop such instructions to carry out the methods within suitably configured processors, such as graphics controller 101. The executable instructions may be written in a computer programming language or may be embodied in firmware logic. Furthermore, it is common in the art to speak of executable instructions as taking an action or causing a result. Such expressions are merely a shorthand way of saying that execution of the instructions by a processor causes the processor to perform an action or a produce a result.

Figure 4A:
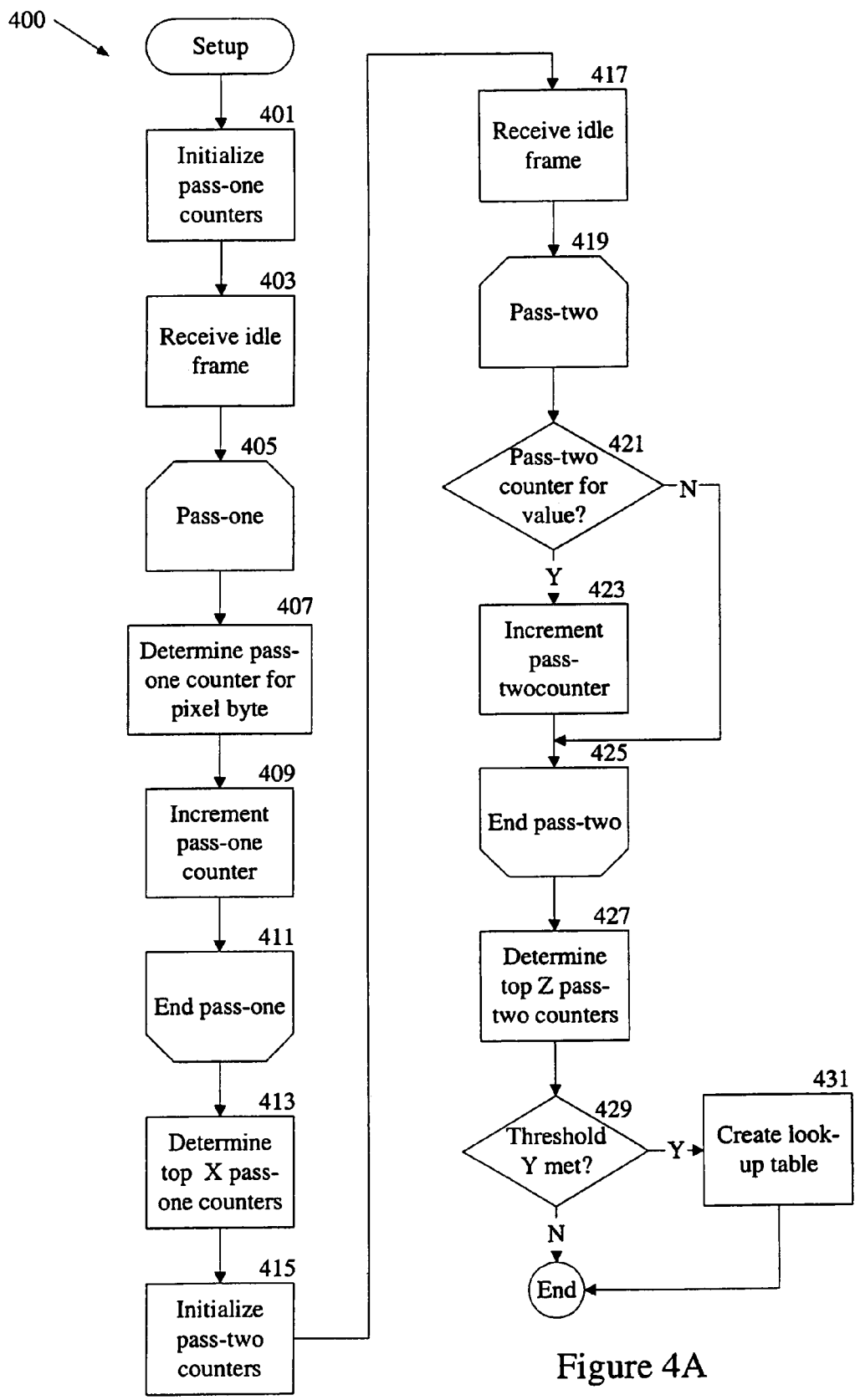
FIG. 4A is a flowchart of a method that creates an encoding table.

Referring first to FIG. 4A, the acts to be performed by a graphics controller executing a two-pass setup method 400 that creates the encoding look-up table 220 are described. The setup method 400 is invoked when the graphics controller receives the idle or override notification from the display driver. The setup method 400 initializes the pixel value counters (block 401) and waits to receive the first idle frame (block 403). For each pixel byte in the idle frame, the method 400 performs pass-one by determining (block 407) and incrementing (block 409) the appropriate pass-one counter. Once all of the pixel bytes within the idle frame have been evaluated in pass-one, the setup method 400 selects the top X pass-one counters. (block 413) and initializes the pass-two counters (block 415). When the method 400 receives another idle frame (block 417), the method performs pass-two by determining which, if any counter, is associated with each pixel byte (block 421) and incrementing the appropriate pass-two counter if the byte value is to be counted (block 423).

Once the second idle frame has been evaluated in pass-two, the setup method 400 determines the top Z pass-two counters (block 427) and determines if the percentage of the top Z pixel values is greater than the threshold Y (block 429). If so, the lookup table is created at block 431. Otherwise, the idle frames will not be compressed.

Figure 4B:
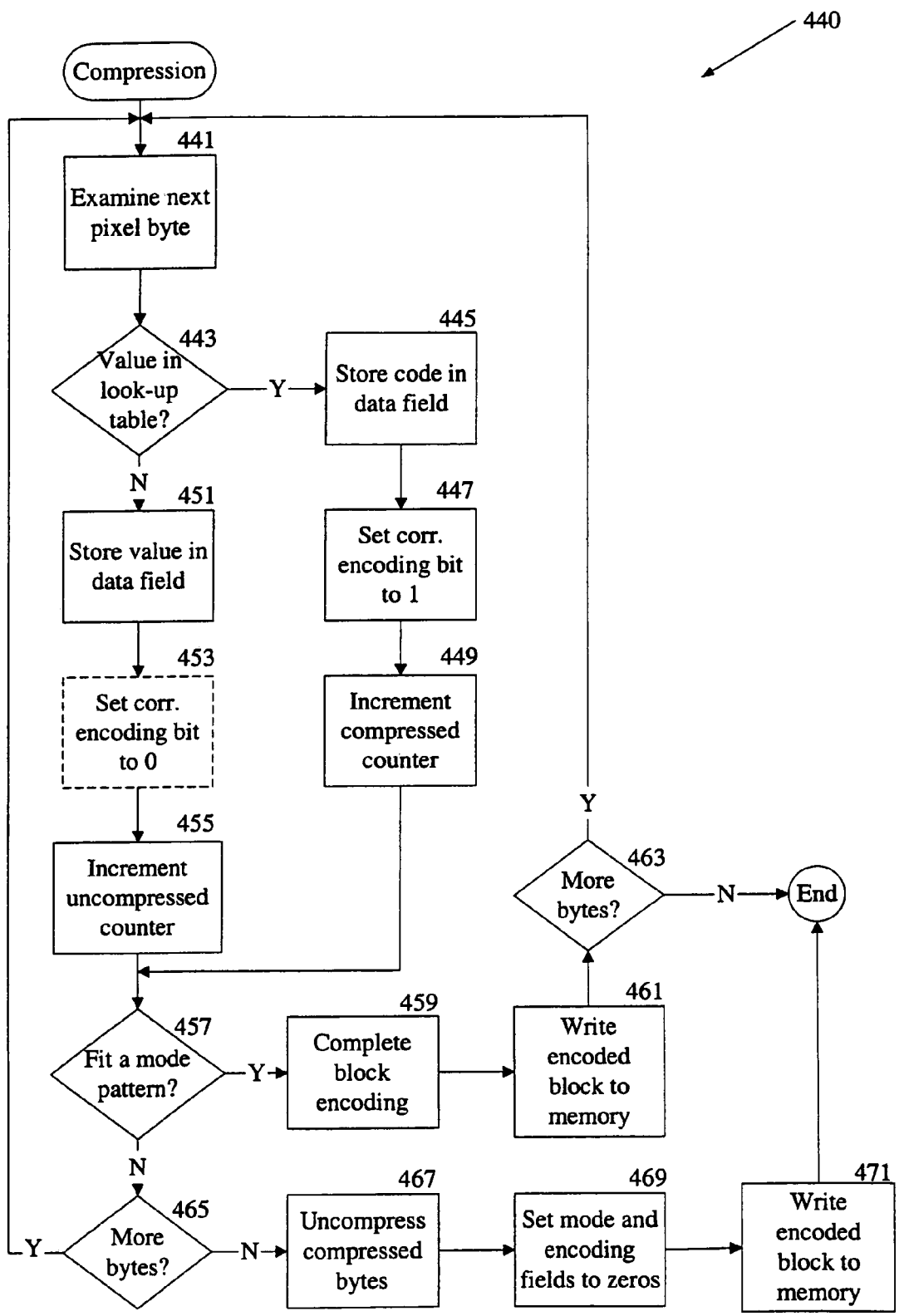
FIGS. 4B–C are flowcharts of methods for encoding and decoding idle frames according to one embodiment of the invention.

FIG. 4B illustrates an compression method 440 that uses the look-up table created by method 400 to compress incoming idle frames before they are stored in graphics memory. Each pixel byte in the frame is examined at block 441 to determine if its value appears in the look-up table (block 443). If so, the corresponding code in the table is stored in the data field of the encoded block (block 445), the corresponding encoding bit is set to one (block 447), and a compressed counter is incremented (block 449). If the pixel byte is not to be compressed, the byte value is stored in the data field (block 451), the corresponding encoding bit is set to zero if not already zero (block 453, shown in phantom), and an uncompressed counter is incremented (block 455).

At block 457, the compression method 440 determines if the current combination of uncompressed and compressed pixel bytes matches a mode pattern. If it does, the mode, encoding and data fields of the block are completed (block 459) and the resulting encoded block is written to memory (block 461). If more pixel bytes remain to be evaluated (block 463), the compression method 440 returns to block 441. When all pixels in the idle frame have been stored in the graphics memory, the compression method 440 terminates.

Assuming the current combination does not fit a mode pattern at block 457, the compression method 440 determines if more pixel bytes remain to be evaluated (block 465). If not, the encoded block will be stored as uncompressed mode 0 so any existing codes in the data field are replaced by their values to uncompress the pixel bytes (block 467), the mode and encoding fields are set to zeros (block 469), and the resulting encoded block is written to memory (block 471).

Figure 4C:
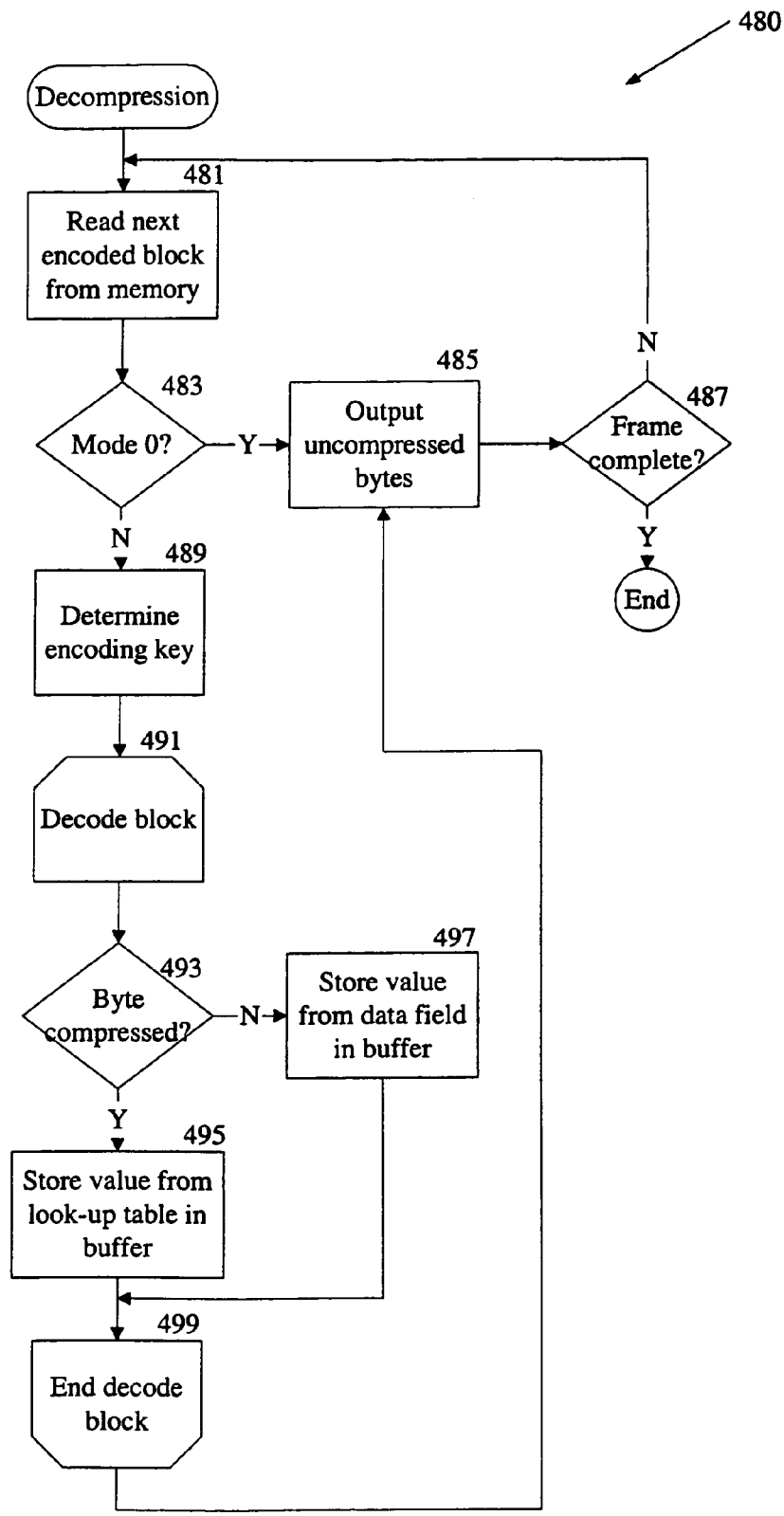

FIG. 4C illustrates a decompression method 480 that corresponds to the compression method 480 of FIG. 4B. When the graphics controller receives a command to refresh the display screen, it reads the idle screen from memory as a sequence of encoded blocks (block 481). The mode field of the encoded block is examined to determine the compression mode of the block. If the mode is zero (block 483), the pixel bytes in the data field of the encoded block are uncompressed and output at block 485. If the mode is not zero, the method 480 determines the length of the encoding key based on the mode (block 489) and begins a decode block process represented by blocks 491 through 499. Each bit in the encoding key is read to determine if the corresponding pixel byte is compressed (block 493). If it is, the two-bit code is read from the data field and the corresponding value in the look-up table is stored in a buffer (block 495). Otherwise, the value is read directly from the data field and stored in the buffer (block 497). When all the data has been parsed from the data field, the buffer is output at block 485. If all the encoded blocks for the frame have been processed (block 487), then the decompression method 480 terminates.

Figure 5A:
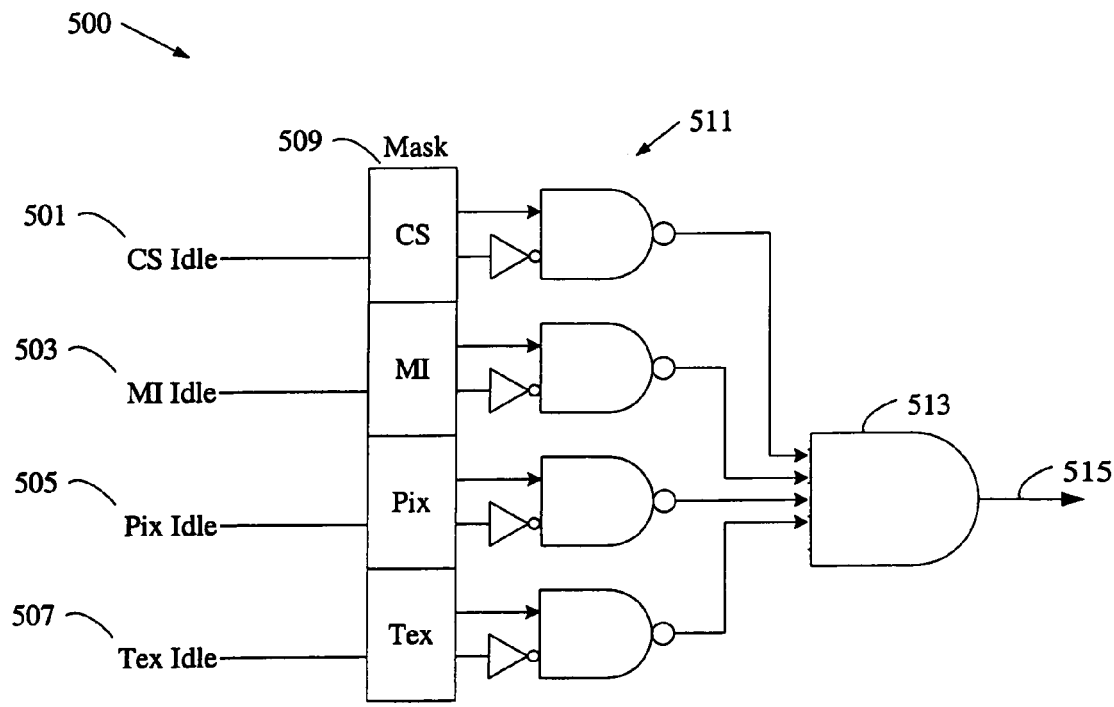
FIG. 5A is a diagram of logic that generates an idle notification to the graphics controller.
Figure 5B:
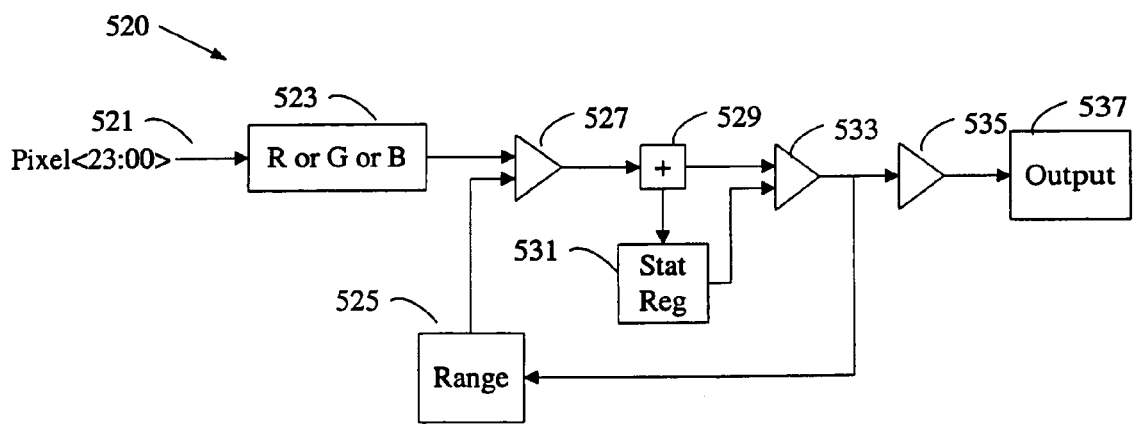
FIG. 5B is a diagram of logic that performs of one embodiment of the method of FIG. 4A.

FIGS. 5A and 5B are examples of logic that perform the operations of the invention. The logic embodiment illustrated in FIG. 5A generates a idle notification 515 to the graphics controller 102 if at least one of several system components is idle, as indicated by a corresponding idle signal of zero. The logic 500 receives a command stream (CS) idle signal 501, a memory interface (MI) idle signal 503, a pixel pipeline (Pix) idle signal 505, and a text pipe line (Tex) idle signal 507. The logic 500 can choose to use only a subset of the idle signals in generating the idle notification 515 by outputting a one from a corresponding mask 509. The output of the mask 509 and the inverted idle signal is input into a set of NAND gates 511. The output from all the NAND gates 511 are input to an AND gate 513. When the idle notification 515 is zero, the graphics controller 101 knows that at least of the chosen system components is idle and proceeds with the idle frame compression as described above.

In one embodiment, the byte values to be compressed are determined using the logic embodiment illustrated in FIG. 5B. Each pixel 521 in a incoming frame is separated into its RGB bytes 523 and the value of each byte is input into a set of N comparators 527, where it is compared with a set of byte value ranges 525 to determine which of a set of N accumulators 529 is associated with its value. The counts from the accumulators 529 are fed into a statistics register 531. Once all the pixel bytes in the current frame have been counted by accumulators 529, the statistics register 531 determines the top X accumulators 529 and causes identifiers for the top X accumulators to be held in X comparators 529. If the current frame is the first idle frame, the byte values associated with the top X accumulators are used as the ranges 525 for the second idle frame. If the current frame is the second idle frame, the identifiers held in comparators 529 correspond to the top X byte values, which are subsequently stored in a set of X registers 535 and output 537 to build the encoding look-up table.

Figure 6:
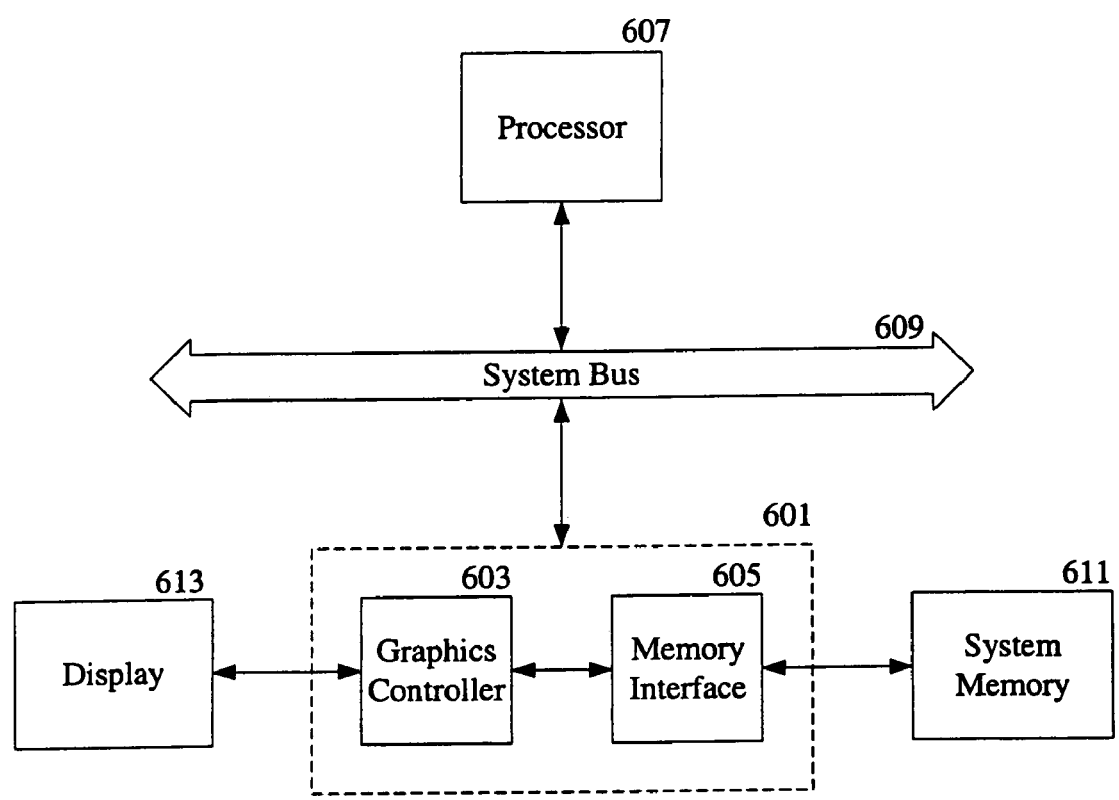
FIG. 6 is a diagram of one embodiment of an embedded graphics and memory chipset in which the present invention may be practiced.
Figure 7:
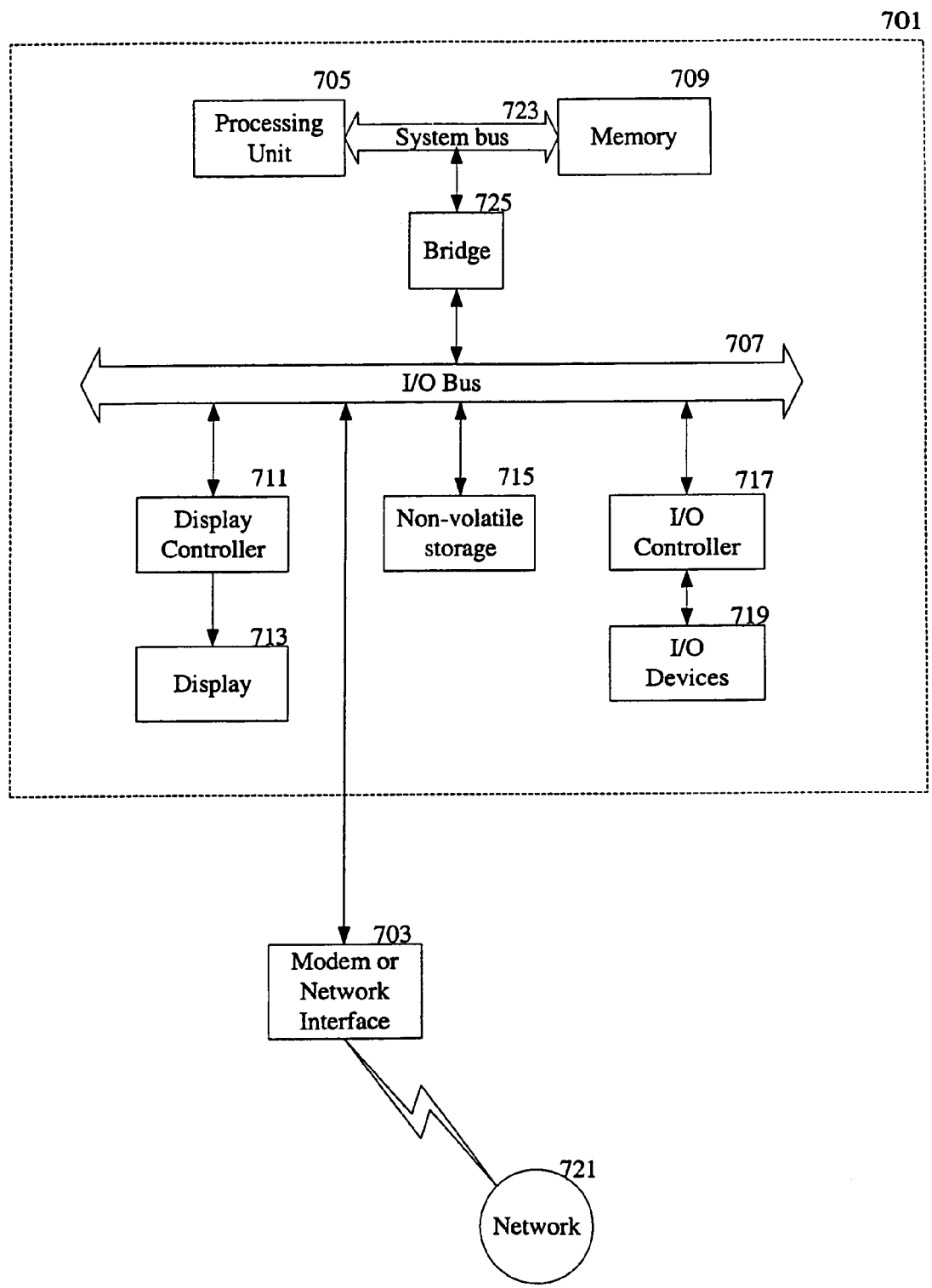
FIG. 7 is a diagram of one embodiment of a computer system in which the present invention may be practiced.

The following descriptions of FIGS. 6 and 7 are intended to provide an overview of computer hardware configurations in which embodiments of the invention can be implemented, but is not intended to limit the applicable environments.

FIG. 6 shows a embedded graphics and memory chipset 601 containing a graphics controller 603 and a memory interface 605. The chipset 601 is coupled to a processor 607 through a system bus 609. The memory interface 605 couples to system memory 611 to provide memory access to both the graphics controller 603 and the processor 607. The graphics chipset 601 incorporates the idle frame compression of the present invention to compress and store idle frames in the system memory and to retrieve and decompress the idle frames for display upon a device display 613.

FIG. 7 shows one example of a conventional computer system containing a processor 701 and memory 709 that is coupled to the processor 705 by a system bus 723. Memory 709 can be dynamic random access memory (DRAM) and can also include static RAM (SRAM). A bridge 725 couples the system bus 723 to an input/output (I/O) bus 707, which further couples a non-embedded display controller 711 that incorporates the present invention, non-volatile storage 715, and an I/O controller 717 to the processing unit 705. A modem or other network interface 703 may also be coupled to the I/O bus 707 to connect the computer system 701 to a network 721. The display controller 711 controls in the conventional manner a display on a display device 713 which can be a cathode ray tube (CRT) or liquid crystal display. The input/output devices 719 can include a keyboard, disk drives, printers, a scanner, and other input and output devices, including a mouse or other pointing device. The display controller 711 and the I/O controller 717 can be implemented with conventional well known technology. The input/output device 719 may also include a digital image input device, such as a digital camera, which is coupled to an I/O controller 717 in order to allow images from the digital image input device to be input into the computer system 701. The non-volatile storage 715 is often a magnetic hard disk, an optical disk, or another form of storage for large amounts of data. Some of this data is often written, by a direct memory access process, into memory 709 during execution of software in the computer system 701. One of skill in the art will immediately recognize that the term "computer-readable medium" includes any type of storage device that is accessible by the processor 705 and also encompasses a carrier wave that comprises a data signal.

It will be appreciated that the computer system 701 is one example of many possible computer systems which have different architectures. A typical computer system for the present invention will usually include, in addition to the graphics controller, at least a processor, memory, and a bus coupling the memory to the processor.

Compression of idle frames within a graphics controller has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A system comprising:
    a graphics controller coupled to a graphics memory; and
    a compression process invoked by the graphics controller upon receipt of an idle notification to cause the graphics controller to compress an idle graphics frame for storage into the graphics memory by representing a pixel value in the idle graphics frame with a code, the pixel value selected based on a number of occurrences of the pixel value in two idle graphics frames.

2. The system of claim 1, wherein the compression process further cause the graphics controller to select the pixel value if the number of occurrences satisfies a threshold.

3. The system of claim 2, wherein the threshold is a percentage of a total number of occurrences of pixel values in the idle graphics frame.

4. The system of claim 1, wherein the compression process further causes the graphics controller to encode a compressed idle graphics frame to identify the code within the compressed idle graphic frame.

5. The system of claim 1, wherein the compression process further causes the graphics controller to uncompress a compressed idle graphics frame retrieved from graphics memory.

6. The system of claim 5, wherein the graphics controller replaces the code with the pixel value when uncompressing the compressed idle graphics frame.

7. The system of claim 6, wherein the compressed idle graphics frame is encoded to identify the code within the compressed idle graphics frame and the graphics controller decodes the compressed idle graphics frame when uncompressing the compressed idle graphics frame.

8. The system of claim 1, wherein the compression process further causes the graphics process to compress a non-idle graphics frame upon receiving an override indicator.

9. The system of claim 1, wherein the system further comprises a processor coupled to the graphics controller through a system bus, the processor executing a display driver to send the idle graphics frame and the idle notification to the graphics controller.

10. The system of claim 9, wherein the system further comprises a system memory coupled to the processor through the system bus, the system memory comprising the graphics memory.

11. The system of claim 9, wherein the system further comprises a display coupled to the graphics controller to display graphics frames stored in the graphics memory.

12. A method comprising:
    selecting a pixel value based on a number of occurrences of the pixel value in two idle graphics frames; and
    representing the pixel value in an idle graphics frame with a code to compress the idle graphics frame.

13. The method of claim 12, wherein the selecting comprises:
    determining if the number of occurrences satisfies a threshold.

14. The method of claim 13, wherein the threshold is a percentage of a total number of occurrences of pixel values in the idle graphics frame.

15. The method of claim 12 further comprising:
    encoding a compressed idle graphics frame to identify the code within the compressed idle graphic frame.

16. The method of claim 12 further comprising:
    uncompressing a compressed idle graphics frame.

17. The method of claim 16, wherein the uncompressing comprises:
    replacing the code with the pixel value.

18. The method of claim 17, wherein the uncompressing further comprises:
    decoding the compressed idle graphics frame when the compressed idle graphics frame is encoded to identify the code.

19. The method of claim 12 further comprising:
    representing a pixel value in a non-idle graphics frame with a code to compress the non-idle graphics frame.

20. A machine-readable medium providing instructions, which when executed by a machine, cause the machine to perform operations comprising:
    selecting a pixel value based on a number of occurrences of the pixel value in two idle graphics frames; and
    representing the pixel value in an idle graphics frame with a code to create a compressed idle graphics frame.

21. The machine-readable medium of claim 20, wherein the selecting comprises:
    determining if the number of occurrences satisfies a threshold.

22. The machine-readable medium of claim 21, wherein the threshold is a percentage of a total number of occurrences of pixel values in the idle graphics frame.

23. The machine-readable medium of claim 20 further comprising:
    encoding a compressed idle graphics frame to identify the code within the compressed idle graphic frame.

24. The machine-readable medium of claim 20 further comprising:
    uncompressing a compressed idle graphics frame.

25. The machine-readable medium of claim 24, wherein the uncompressing comprises:
    replacing the code with the pixel value.

26. The machine-readable medium of claim 25, wherein the uncompressing further comprises:
    decoding the compressed idle graphics frame when the compressed idle graphics frame is encoded to identify the code.

27. The machine-readable medium of claim 20 further comprising:
representing a pixel value in a non-idle graphics frame with a code to compress the non-idle graphics frame.

28. An apparatus comprising:
means for receiving graphics frames; and
means for creating an encoding lookup table, wherein the means for creating selects a pixel value based on a number of occurrences of the pixel value in two idle graphics frames and determines a code to replace the pixel value in a graphics frame.

29. The apparatus of claim 28, wherein the means for selecting further determines if the number of occurrences satisfies a threshold.

30. The apparatus of claim 29, wherein the threshold is a percentage of a total number of occurrences of pixel values in an idle graphics frame.

31. The apparatus of claim 28, wherein the means for selecting further associates the pixel value and the code in the encoding lookup table.

* * * * *